United States Patent
Tamburro et al.

[15] 3,707,300
[45] Dec. 26, 1972

[54] TAMPERPROOF SERIAL NUMBER

[72] Inventors: Robert J. Tamburro, 1273 Trapelo Road, Waltham, Mass. 02154; Ronald N. Ohanian, 16 Whites Avenue, Watertown, Mass. 02172

[22] Filed: Sept. 1, 1971

[21] Appl. No.: 177,044

[52] U.S. Cl. ................................283/8, 40/129 C
[51] Int. Cl. ..................B42d 15/00, B09f 17/00
[58] Field of Search...................283/6–9, 18; 40/2, 40/2.2, 129 C

[56] References Cited

UNITED STATES PATENTS

| | | | |
|---|---|---|---|
| 2,083,206 | 6/1937 | Schoeller | 283/8 A X |
| 2,874,977 | 2/1959 | Morris | 283/6 |
| 3,221,428 | 12/1965 | Fischler et al. | 40/2.2 |

Primary Examiner—Lawrence Charles
Attorney—Richard F. Benway

[57] ABSTRACT

A serial number is imprinted on a chemical saturated tape encapsulated in plastic and surrounded by another pre-selected chemical in turn enclosed in a plastic container and affixed to an automobile or other item of personal property—said serial number will be destroyed due to intermixing of the chemicals when the serial number is tampered with.

5 Claims, 4 Drawing Figures

INVENTORS
ROBERT J. TAMBURRO
RONALD N. OHANIAN
BY
ATTORNEY

TAMPERPROOF SERIAL NUMBER

Motor vehicles and other large items of personal property have assigned to them certain serial numbers. There is quite often really no way of distinghishing the ownership of a given motor vehicle or other item of personal property that is made on an assembly line but for the serial number. Therefore if an automobile or item of personal property is stolen and one is able to change the serial number with any ease, it is difficult and in some instances impossible to trace the motor vehicle so that the true owner may recover his property.

Each year thousands of motor vehicles are stolen. A significant number, approximately 15 percent, are never returned to their true owner. The absolute number of stolen automobiles and the percentage which are not returned to the owner are ever increasing. It would be expected that the person who receives the stolen property would have to register or record his ownership in the various states. When he does, if the motor vehicle has been reported stolen, the given serial number would show up and the true owner would thereby recover his property. Such is not the case however because a serial number can be easily removed and replaced by another number which has been removed from another motor vehicle that is perhaps a wreck or it can be a duplicate of another motor vehicle of similar model which has not been stolen.

The present invention prevents transferring serial numbers from one motor vehicle to another motor vehicle. It is accomplished simply by this. The device or invention is made in such a manner that it is completely destroyed if an attempt is made to remove it or alter its number. The government therefore through the manufacturer will know definitely what number has been assigned to a given motor vehicle. The serial numbers in accordance with the present invention are therefore non-transferable between vehicles, moreover, they can be destroyed very easily in a wrecked automobile by driving an icepick or other sharp device through the number such that the chemicals constituting the invention intermix and destroy the serial number.

Therefore an object of the present invention is to provide a tamperproof serial number.

Another object of the present invention is to make a serial number which when installed on an item of personal property cannot be removed without being destroyed.

Another object of the present invention is to provide a serial number which can be readily destroyed or obliterated in wrecked automobiles such that they cannot be utilized again.

Further objects advantages and features of the present invention will be better understood from the following detailed specification, especially when read in conjunction with the attached drawings of which:

Figure 1:
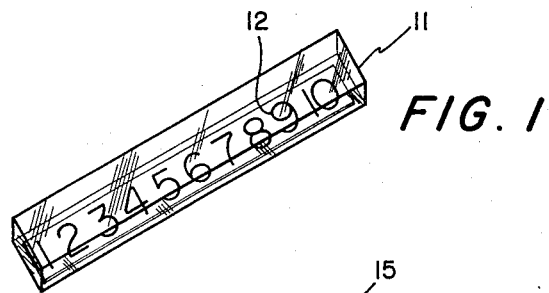
FIG. 1 is a top view of the serial number in accordance with the present invention.

Referring to FIG. 1 we see the serial numbers 12 imprinted and encased within a cover 11. The tape on which the numbers are printed has been treated and it is surrounded by a fluid within case 11 which when installed within a motor vehicle or other item of personal property will be glued or affixed to a rigid surface. With an attempt to remove it, it will crack and the chemicals will intermix which will obliterate the serial number printed on the tape.

Figure 2:
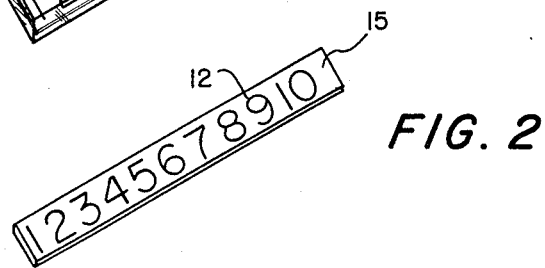
FIG. 2 is a top view of the serial number applied to a tape apart from the invention.

Referring to FIG. 2 we see the tape 15 in detail. Tape 15 is imprinted with figures which constitute the serial number 12. The tape is then saturated with a preselected chemical and dried. After the tape has been saturated with the chemical and printed (the sequence could be in reverse order no matter) it is desirable to encapsulate it with a very thin film of plastic. The plastic material is preferably a thermal setting type well known in the art.

An important characteristic of the plastic that is used to encapsulate the tape is that it is not yieldable. That is it will crack or break if it is bent or twisted to any great extent. These physical features of the plastic are readily incorporated into the plastic materials in manufacture which is well-known in the art and will not be discussed further.

Figure 3:
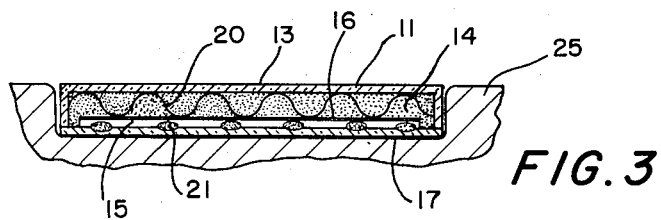
FIG. 3 is a side view of the assembled serial number.

Referring now to FIG. 3 we see tape 15 which has a very thin coating (spoken of above) 16. Running under coated tape 15 are openings 21 which form small cells which permit storage of fluid underneath the tape as it is affixed to base 17 of the container 11. We also note a transparent serpentine insertion 20 which is placed over the tape and within container 11 which has a top side 13 and end portions as well as a base 17. Within the container 11 a fluid is placed, which completely engulfs and encircles the tape and fills the voids and cells alluded to above.

If someone were to attempt to drill a hole in container 11, they could not draw off the fluid entirely because the fluid would be filling the small cells spoken of above. If the tape were attempted to be removed, it would crack and the fluid stored in the cells would intermix with the dry chemical that has saturated the tape initially and the chemical reaction resulting therefrom would cause the number to be completely obliterated.

It is contemplated that container 11 would be recessed (which is presently being done) within the dashboard of an automobile. The base 17 would be glued within the opening to a firm surface below which would prevent anyone from prying it out without causing a stress to be placed on the encapsulated tape 15 which would cause the rupture of the plastic coating 16 which in turn would permit the intermixing of the chemicals and obliteration of the tape and consequently the serial number.

Figure 4:
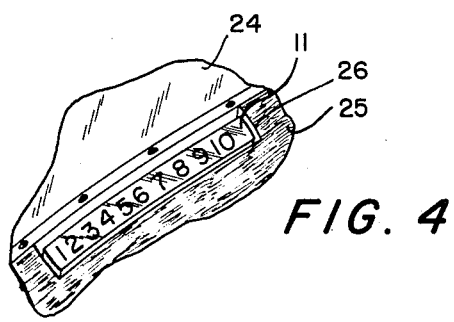
FIG. 4 is a view of the serial number when installed in the dashboard of an automobile.

Referring now to FIG. 4 we see the serial number and its container installed within a dashboard 25 of the automobile at the edge of windshield 24. A police officer or anyone wishing to examine the number can look through the transparent plastic material which makes up container 11's top surface 13 and the serpentine insertion 20 and readily view the numbers without difficulty. The fluid also being transparent presents no problem or obstruction to one reading the serial number.

Many chemical combinations for tape and fluid can be selected which will cause discoloration and obliteration of the imprinted tape. A preferred chemical combination employed in the present invention has been for the tape to be dipped in ammonia or trygulate acid, or sulfinate trygulate acid, or finally silver nitrate. Printing can precede or follow saturation of the tape. Obviously, it is preferrable to saturate the tape first and then print on it. If the ink is missable with the chemical which will saturate the tape or paper, it will be preferable to saturate the tape first then print on it. The chemical fluid which fills the container and engulfs the tape has been largely colbalt salt diluted somewhat in water. We have also used with some success nickel chloride.

Many substitutions in the chemicals can be made. For instance, litmus paper may be used to print on before it is encapsulated. Diluted hydrochloric acid which is clear when it comes in contact with the paper will change the paper to a deep red. So too white phenolphthalein when in contact with ammonia will turn black. A solution of white starch diluted with water when contacted with white iodine diluted also with water will form a brilliant blue. A ferric chloride solution against a solution of potassium ferro cyanide will create a prussian blue. Ferrous chloride in contact with ammonia will cause a black color. Copper sulfate when in contact with sodium hydroxide will turn a dirty bluish color. Silver nitrate against clear ammonia will show a gray-black color. The list could be continued but it is quite evident that any number of a combination of chemicals which when intermixed will change colors can be provided with the present invention and achieve the goal of obliteration of the serial number once an attempt has been made to remove it from an automobile. Furthermore it can be seen by judicious selection of the various chemicals that a third ingredient can be introduced into the scheme. That is, unauthorized fabrication of serial numbers will become a very difficult task indeed. Not only will one have to be able to fabricate the physical structure, they must be able to select the particular chemical combination known only to the authorities in advance. Consequently one can determine very accurately whether a substituted or bogus serial number has been used. However it is felt that the tamperproof serial number as it is presently constituted in this invention will be more than adequate discouragement for thieves in the transfer of bogus serial numbers from one vehicle to another without reliance on reference to particular combinations of chemicals.

Although we have described our invention with reference to specific apparatus those skilled in the art may make many substitutions and variations without departing from its true scope and spirit. We therefore wish to be limited in our invention only by the appended claims.

We claim:

1. A tamperproof serial number comprising,
a tape for receiving printed numbers or letters,
chemical means for saturating said tape,
a plastic coating for encapsulating said saturated tape,
a sealed transparent chamber for receiving said coated saturated tape,
a transparent fluid for filling said chamber thereby surrounding said tape,
said fluid and said saturating chemical corelating in contact to obliterate said printing.

2. A tamperproof serial number according to claim 1 which further includes means for dividing said compartment into multiple chambers thereby preventing removal of said fluid.

3. A tamperproof serial number according to claim 2 wherein said tape is affixed to the bottom of said chamber whereby movement of the chamber will result in repture of said tape coating.

4. A tamperproof serial number according to claim 3 wherein said fluid is a semi-paste which will not drain off if the chamber should leak.

5. A tamperproof serial number according to claim 4 wherein said chemical means is selected from the group consisting of ammonia, trygulate acid, sulfanate trygulate acid, and silver nitrate, and said fluid is selected from the group consisting of cobalt salt in solution, nickel chloride in solution, and ammonium chloride in solution.

* * * * *